(12) United States Patent
Lee

(10) Patent No.: US 7,380,804 B2
(45) Date of Patent: Jun. 3, 2008

(54) VIBRATION DAMPING APPARATUS FOR STEERING SYSTEMS

(75) Inventor: Jong-Gil Lee, Incheon (KR)

(73) Assignee: Kia Motors Corporation, Seoul (KR)

( * ) Notice: Subject to any disclaimer, the term of this patent is extended or adjusted under 35 U.S.C. 154(b) by 414 days.

(21) Appl. No.: 11/299,356

(22) Filed: Dec. 8, 2005

(65) Prior Publication Data

US 2007/0085291 A1 Apr. 19, 2007

(30) Foreign Application Priority Data

Oct. 17, 2005 (KR) ...................... 10-2005-0097391

(51) Int. Cl.
*B62D 7/22* (2006.01)
(52) U.S. Cl. .................... 280/90; 280/777; 280/779
(58) Field of Classification Search .................. 280/90, 280/777, 779, 89.13; 188/267
See application file for complete search history.

(56) References Cited

U.S. PATENT DOCUMENTS

| | | | | |
|---|---|---|---|---|
| 5,272,933 A | * | 12/1993 | Collier et al. .................. 74/498 |
| 5,313,389 A | * | 5/1994 | Yasui ........................ 701/43 |
| 5,582,265 A | * | 12/1996 | Martin ....................... 180/426 |
| 5,779,013 A | * | 7/1998 | Bansbach .................. 192/21.5 |
| 6,158,470 A | * | 12/2000 | Ivers et al. .................. 137/807 |
| 6,279,952 B1 | * | 8/2001 | Van Wynsberghe et al. ........................... 280/777 |
| 6,296,280 B1 | * | 10/2001 | Struble et al. .............. 280/777 |
| 6,318,522 B1 | * | 11/2001 | Johnston et al. ......... 188/267.2 |
| 6,390,253 B1 | * | 5/2002 | Oliver ..................... 188/267.2 |
| 6,491,313 B1 | * | 12/2002 | Rui et al. ..................... 280/90 |
| 6,497,308 B2 | * | 12/2002 | Lisenker .................. 188/267.2 |
| 6,752,425 B2 | * | 6/2004 | Loh et al. .................... 280/779 |
| 2004/0084887 A1 | | 5/2004 | Loh et al. | |

FOREIGN PATENT DOCUMENTS

| | | |
|---|---|---|
| EP | 0 150 303 A1 | 8/1985 |
| JP | 03-266771 | 11/1991 |
| JP | 05-001743 | 1/1993 |

* cited by examiner

*Primary Examiner*—Toan C To
(74) *Attorney, Agent, or Firm*—Morgan Lewis & Bockius LLP

(57) ABSTRACT

Disclosed herein is a vibration damping apparatus for steering systems. The vibration damping apparatus of the present invention includes a fluid-filled chamber which is provided between upper and lower shafts, an upper actuating member which has a female bladed part disposed in the fluid-filled chamber, and a lower actuating member which has a male bladed part disposed in said fluid-filled chamber. Thus, the vibration damping apparatus of the present invention effectively interrupts the transmission of vibrations from the steerable wheels of an automotive vehicle the steering wheel, thereby optimizing driving comfort and safety.

4 Claims, 5 Drawing Sheets

VIBRATION DAMPING APPARATUS FOR STEERING SYSTEMS

CROSS-REFERENCE TO RELATED APPLICATIONS

The present application claims priority of Korean Application Serial Number 10-2005-0097391, filed on Oct. 17, 2005, with the Korean Intellectual Property Office, the disclosure of which is fully incorporated herein by reference.

FIELD OF THE INVENTION

The present invention relates to steering systems in automotive vehicles, and more particularly, to apparatuses for suppressing vibrations in the steering system that may otherwise be transmitted to the steering wheel.

BACKGROUND OF THE INVENTION

The steering wheel of an automotive vehicle is a member for allowing an operator of the vehicle to steer the vehicle. The operator of the vehicle almost always handles directly the steering wheel during driving the vehicle, and typically develops sensitivity to even minute vibrations excited in the steering wheel. Such vibrations may be caused by brake roughness, tire/wheel imbalance, road input, etc. and are often transmitted to the steering wheel from the wheels of the automotive vehicle.

Since the vibrations excited in the steering wheel greatly impact the riding comfort of the vehicle as felt by the operator, methods and apparatuses for damping these vibrations have been sought. Previous efforts to eliminate steering wheel vibrations have focused on designing and tuning the elastomeric bushings, bearings, and joints used throughout the steering and suspension systems to achieve a desired level of vibration damping. Unfortunately, these efforts have had only limited success, and they often require compromises in other vehicle attributes such as ride, steering feel, rolling comfort, and impact harshness. As such, there is a need in the art for improved vibration damping apparatuses for steering systems.

SUMMARY OF THE INVENTION

The present invention provides vibration damping apparatuses for steering systems that can effectively prevent vibrations from being transmitted from the wheels of an automotive vehicle to the steering wheel. The comfort of the operator and stability of the vehicle are thereby greatly enhanced.

In some embodiments of the present invention, a vibration damping apparatus for steering systems includes: (a) an upper shaft coupled to a steering wheel; (b) a lower shaft coupled to a gear box; (c) a fluid-filled chamber located between the upper and lower shafts; (d) a lower actuating member splined to the lower shaft, said lower actuating member comprising a male bladed part, positioned in the fluid-filled chamber and having at least one orifice; (e) an upper actuating member splined to the upper shaft, said upper actuating member comprising a female bladed part that couples with the male bladed part within the fluid-filled chamber; (f) a orifice control means which controls the opening and closing of the orifice; (g) a fluid-filled chamber support means which supports the fluid-filled chamber such that the fluid-filled chamber does not contact the upper and lower shafts; and (h) a controller operative to move the fluid-filled chamber support means, detect rotational displacement of the steering wheel, and control the orifice control means based on the rotational displacement of the steering wheel.

DETAILED DESCRIPTION OF THE PREFERRED EMBODIMENTS

Figure 1:
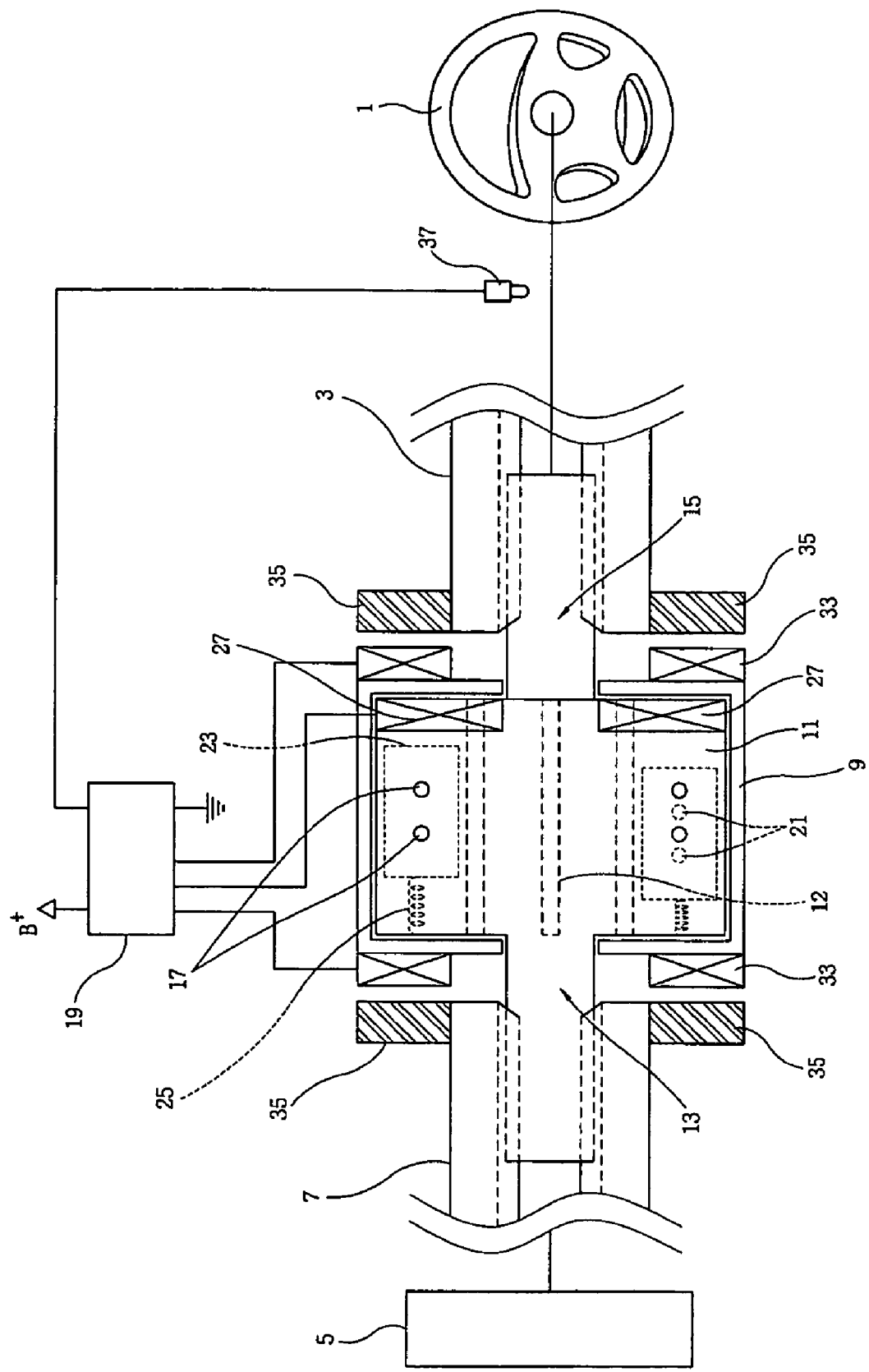
FIG. 1 is a view illustrating the construction of a vibration damping apparatus for steering systems, according to an embodiment of the present invention.

Referring to FIG. 1, a vibration damping apparatus for steering systems according to a preferred embodiment of the present invention includes an upper shaft 3 which is coupled to a steering wheel 1, a lower shaft 7 which is coupled to a gear box 5, and a fluid-filled chamber 9 disposed between the upper and lower shafts 3 and 7. The vibration damping apparatus further includes a lower actuating member 13 which is splined to the lower shaft 7 and comprises a male bladed part 11 that is positioned within the fluid-filled chamber 9, and an upper actuating member 15 which is splined to the upper shaft 3 comprises a female bladed part 12, which couples with the male bladed part 11 within the fluid-filled chamber 9. The male bladed part 11 has orifices 17 formed therein. The vibration damping apparatus further includes a orifice control means which controls the opening and closing of the orifices 17, a fluid-filled chamber support means which supports the fluid-filled chamber 9 such that the fluid-filled chamber 9 is prevented from contacting the upper and lower shafts 3 and 7, and a controller 19 which is operable to move the fluid-filled chamber support means, detect rotation of the steering wheel 1, and control the orifice control means based on the rotation of the steering wheel 1.

Figure 2:
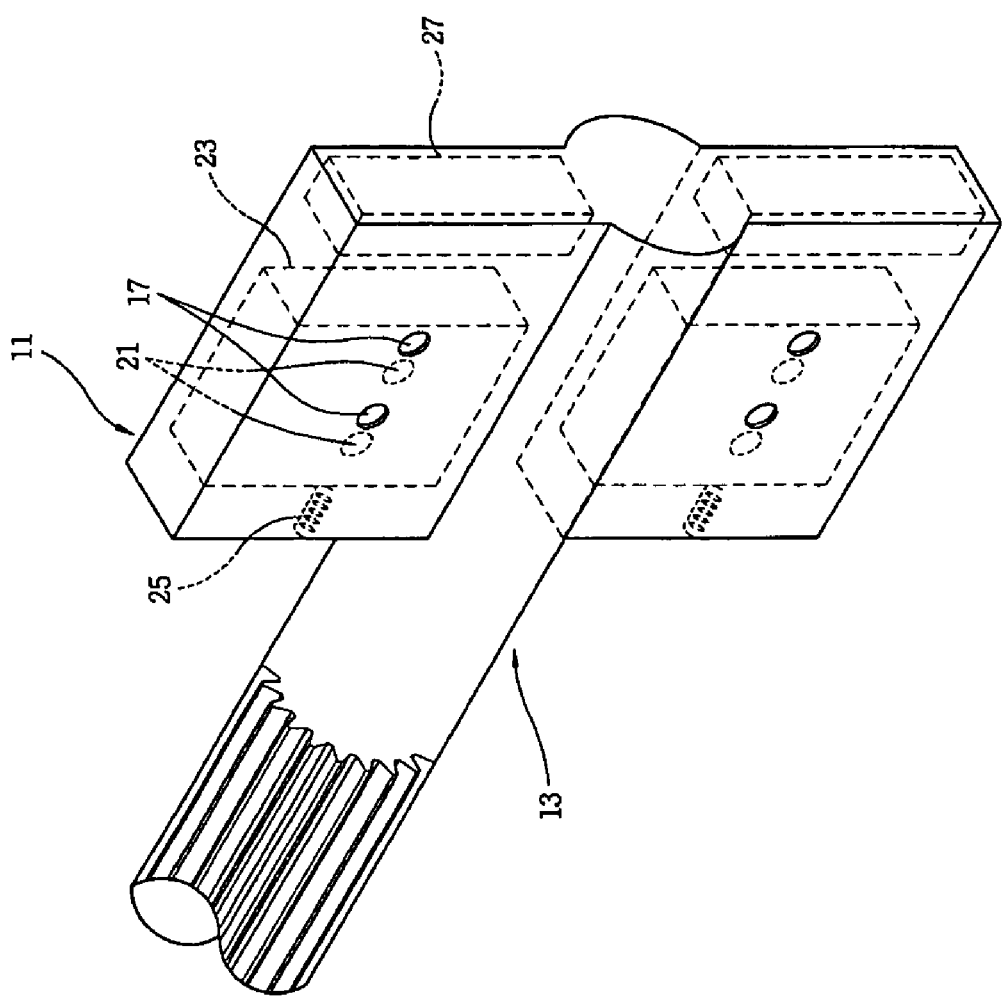
FIG. 2 is a perspective view of a lower actuating member of the vibration damping apparatus of FIG. 1 which is provided with a male bladed part.

In some embodiments, as shown in FIG. 2, the male bladed part 11 of the lower actuating member 13 has two blades of predetermined lengths which extend outward in opposite directions from a central shaft of the male bladed part 11. The orifice control means is disposed within the male bladed part 11.

The orifice control means includes a stop piece 23 which is provided in the male bladed part 11 so as to permit movement along an axis. Communicating orifices 21 are formed in the stop piece 23 so that the degree of alignment (or lack thereof) of the communicating orifices 21 with the orifices 17 of the male bladed part 11 varies depending on the linear movement of the stop piece 23. The orifice control means further includes (a) a spring 25, which elastically supports the stop piece 23 within one end of each blade of the male bladed part 11 such that the stop piece 23 is pulled in a first direction, and (b) a orifice control electromagnet 27, which serves to pull the stop piece 23 in a second direction using magnetic force that is controlled by controller 19; the arrangement is designed to allow the orifices 17 and communicating orifices 21 to communicate with one another.

To illustrate the operation of these parts, when the controller 19 directs the application of electricity to the orifice control electromagnet 27, the stop piece 23 is moved in a linear fashion so that the communicating orifices 21 can come into alignment with the orifices 17. When this occurs, fluid in the fluid-filled chamber 9 can then pass through the male bladed part 11. However, when the flow of electricity to the orifice control electromagnet 27 is interrupted, the stop piece 23 is returned to the original position by the spring 25. In this manner, the communicating orifices 21 and the orifices 17 become so misaligned to the extent that the fluid in the fluid-filled chamber 9 can no longer pass through the male bladed part 11.

Figure 3:
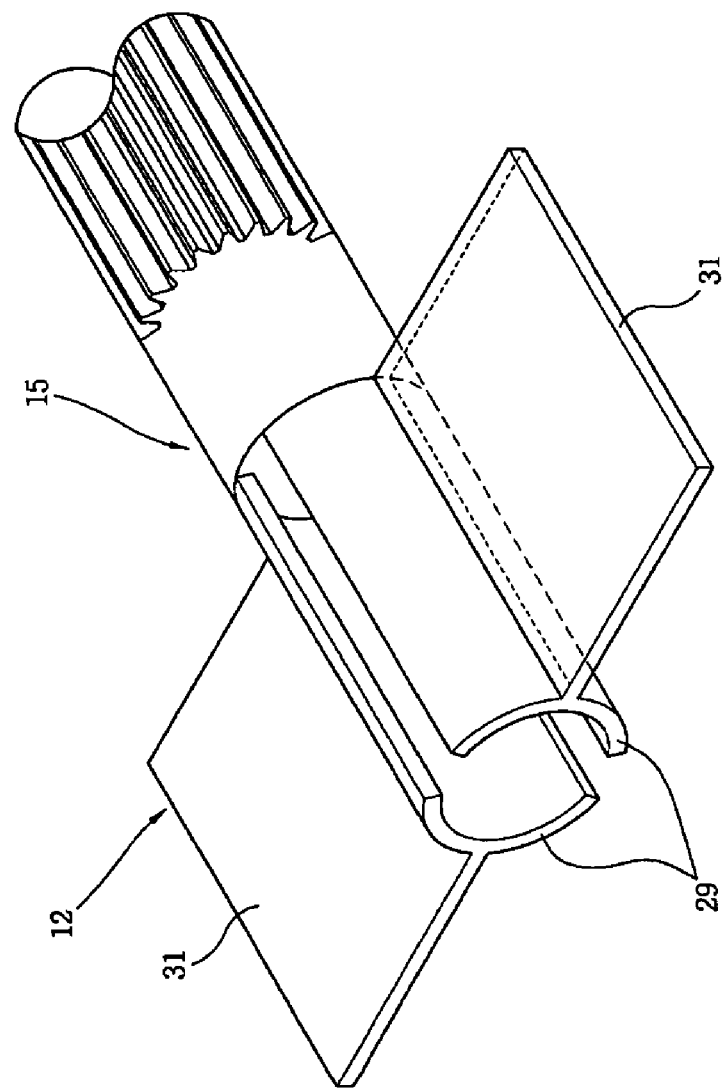
FIG. 3 is a perspective view of an upper actuating member of the vibration damping apparatus of FIG. I which is provided with a female bladed part.
Figure 4:
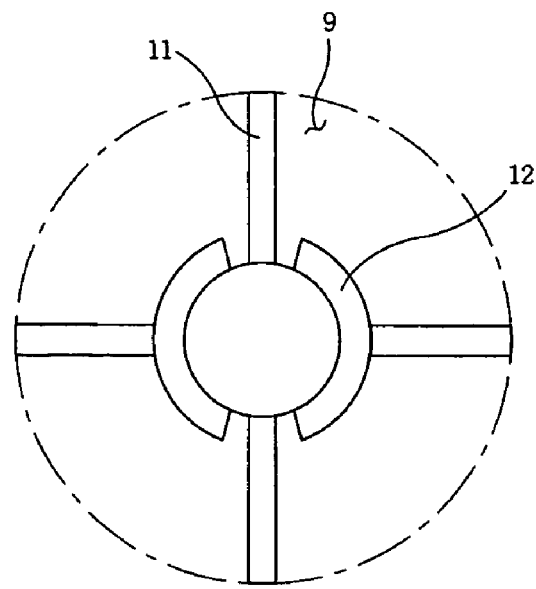
FIG. 4 is a view illustrating the coupling of the male bladed part to the female bladed part according to the present invention.

In some embodiments of the present invention, as shown in FIG. 3, the female bladed part 12 comprises of two shaft parts 29 having an arc configuration from a cross-sectional view. These two shaft parts of the female bladed part 12 are configured in such a manner as to permit coupling with the male bladed part 11, which is inserted therein. When the female bladed part 12 and male bladed part 11 are coupled together as shown in FIG. 4, the blades of the male bladed part 11 should extend outwards through the gaps provided between the two shaft parts of the female bladed part 12 and be rotatable within a certain angular range as defined by the gaps. The predetermined angular range is set by determining the acceptable angle of rotation of the male bladed part 11 with respect to the female bladed part 12. The female bladed part 12 further includes one or more blades 31 which protrude from the exterior of each shaft part 29.

In other words, the predetermined angular range is a design value to be determined according to the acceptable angular range for rotation of the male bladed part 11 with respect to the female bladed part 12 without power transmission between them. The shaft parts 29 serve to maintain the relative angle between the male bladed part 11 and the female bladed part 12 within a predetermined range. Preferably, the angular range of rotation of the male bladed part 11 with respect to the female bladed part 12 is set to an angular range from approximately 5 to approximately 30 degrees.

In some embodiments, as shown in FIG. 1, the fluid-filled chamber support means includes a plurality of electromagnets 33 which is under the control of controller 19 and positioned on each end of the fluid-filled chamber 9, i.e. one at a first end of the fluid-filled chamber 9 adjacent to the upper shaft 3 and another at a second end of the fluid-filled chamber 9 adjacent to the lower shaft 7. The fluid-filled chamber support means further includes a plurality of permanent magnets 35. As FIG. 1 illustrates, each permanent magnet 35 is connected to a shaft, i.e. upper and lower shafts 3 and 7, so as to apply magnetic force to each of the electromagnets 33.

In some embodiments of the present invention, the controller 19 determines whether an operator of the vehicle is turning the steering wheel 1 for cornering by using a torque sensor 37 mounted to the steering column. If the operator of the vehicle is cornering, the supply of electricity to the orifice control electromagnet 27 is interrupted. If the operator of the vehicle is not cornering, electricity is supplied to the orifice control electromagnet 27 such that the orifices 17 and the communicating orifices 21 communicate with each other.

Figure 5:
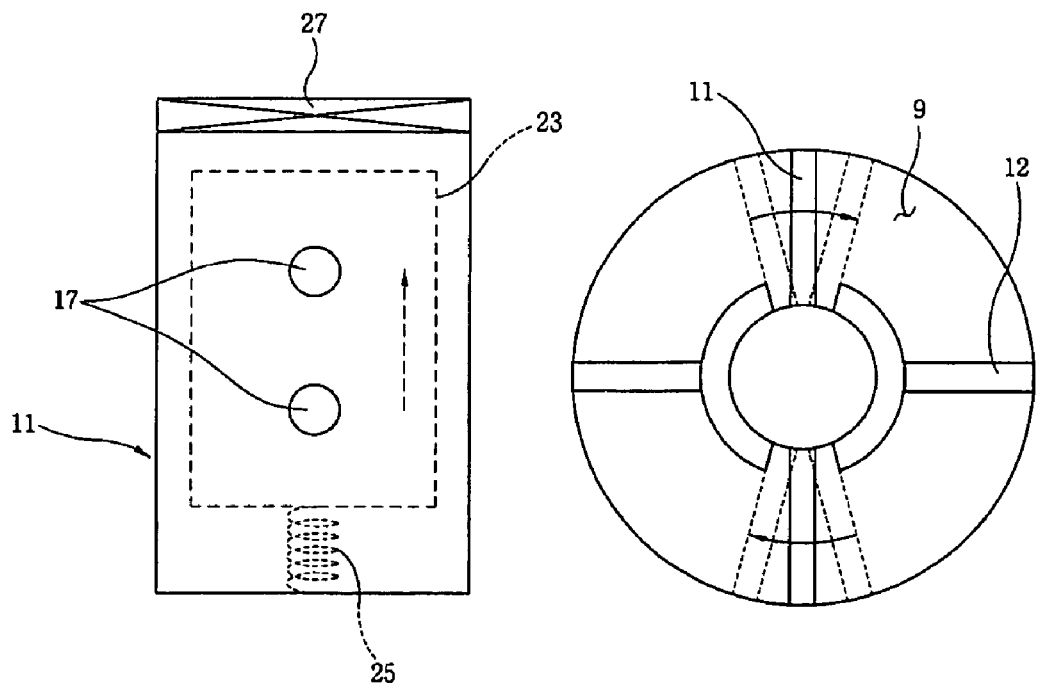
FIG. 5 is a view illustrating rotational vibration damping when no steering force is being applied.

As shown in FIG. 5, rotational vibrations transmitted from the lower shaft 7 cause the lower actuating member 13 to rotate back and forth, i.e. clockwise and counterclockwise, which in turn causes the male bladed part 11 to rotate back and forth within the fluid-filled chamber 9. At this time, controller 19 uses the torque sensor 37 to determine whether the operator of the vehicle is cornering. If no steering force by the operator is being applied, electricity is supplied to the orifice control electromagnets 27. When this occurs, the stop piece 23 is pulled towards the orifice control electromagnet 27, so that orifices 17 and the communicating orifices 21 communicate with each other, as shown in FIG. 5.

The fluid in the fluid-filled chamber 9 is then able to pass through channels defined by the orifices 17 and the communicating orifices 21, which communicate with each other, so that the male bladed part 11 is rotatable with respect to the female bladed part 12 within the angular range permitted by the gaps between the two shaft parts 29 of the female bladed part 12. See drawing on the right in FIG. 5. In this manner, rotational vibrations within the range in which the male bladed part 11 is allowed to rotate with respect to the female bladed part 12 are not transmitted to the female bladed part 12.

At the same time, the fluid, passing through the channels defined by the orifices 17 and the communicating orifices 12, damps the rotational vibrations of the male bladed part 11 and makes it possible for the male bladed part 11 to rotate with respect to the female bladed part 12 without transmitting the rotating force to the female bladed part 12.

In this state, the rotational vibrations transmitted from steerable wheels to the lower shaft 7 are interrupted in the fluid-filled chamber 9 and do not transmit onto the upper shaft 3, thereby imperceptible to the operator of the vehicle.

Figure 6:
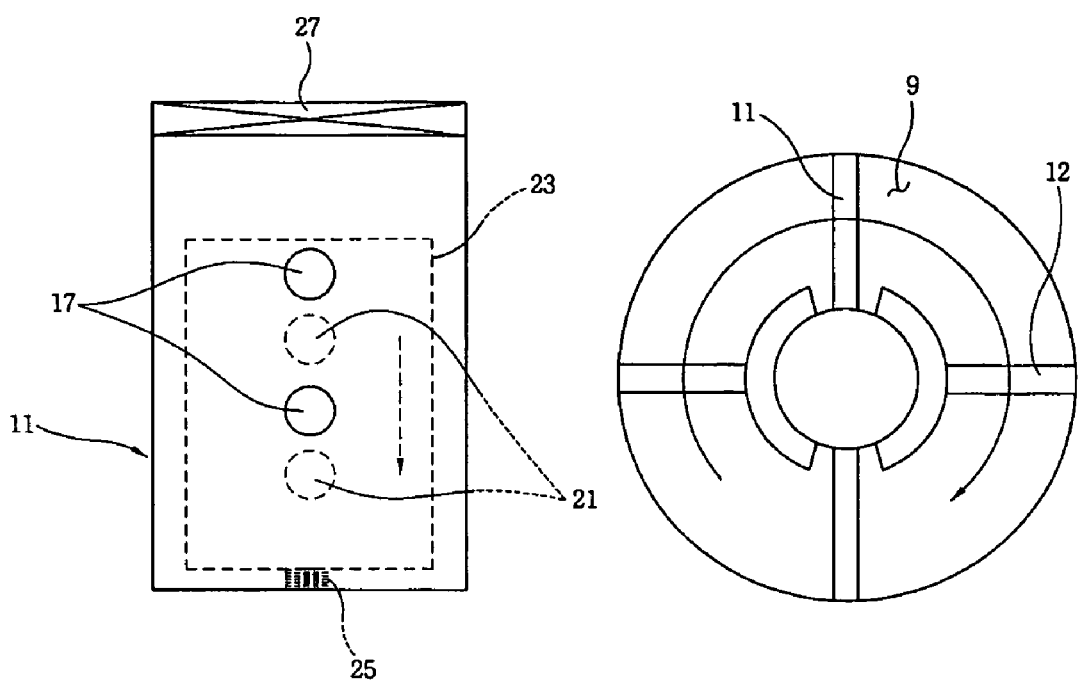
FIG. 6 is a view illustrating the operation of the vibration damping apparatus of FIG. 1 when steering force is being applied.

Once the torque sensor 37 of controller 19 detects steering force from the operator of the vehicle, the electricity, which has been supplied to the orifice control electromagnet 27, is immediately interrupted. This is illustrated in FIG. 6, which shows the stop piece 23 being pulled by the spring 25 such that communicating orifices 21 come out of alignment with orifices 17. In this state, fluid from the fluid-filled chamber 9 can no longer pass through the male bladed part 11. Due to the incompressibility of fluid in the fluid-filled chamber 9, the rotating force of the female bladed part 12, which the fluid pushes up against, is completely transmitted to the male bladed part 11. Consequently, when the female bladed part 12 rotates, the male bladed part 11 is rotated along with the female bladed part 12, so that the steering force of the operator of the vehicle is transmitted to the gear box 5 through the lower shaft 7.

Meanwhile, when the vehicle is in operation, the controller 19 directs electricity to be supplied to electromagnets 33 and the fluid-filled chamber 9 is prevented from contacting the lower shaft 7 and the upper shaft 3 by the magnetic force generated by electromagnets 33 and permanent magnets 35.

Therefore, axial vibrations transmitted from the steerable wheels to the lower shaft 7 are absorbed by sliding motion both at the junction between the lower shaft 7 and the lower actuating member 13, which are splined to each other, and at the junction between the upper shaft 3 and the upper actuating member 15, which are splined to each other. As a result, axial vibrations are not transmitted to the upper shaft 3, thus being imperceptible to the operator of the vehicle gripping the steering wheel.

As is apparent from the foregoing, a vibration damping apparatus for a vehicle according to the present invention efficiently interrupts the transmission of vibrations from the steerable wheels of an automotive vehicle.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth herein.

What is claimed is:

1. A vibration damping apparatus for steering systems, comprising:
    (a) an upper shaft coupled to a steering wheel;
    (b) a lower shaft coupled to a gear box;
    (c) a plurality of fluid-filled chambers provided between said upper and lower shafts;
    (d) a lower actuating member splined to the lower shaft, said lower actuating member comprising a male bladed part, positioned in the fluid-filled chamber and having at least one orifice;
    (e) an upper actuating member splined to the upper shaft, said upper actuating member comprising a female bladed part that couples with the male bladed part within the fluid-filled chamber;
    (f) a plurality of orifice control means which controls the opening and closing of each orifice;
    (g) a plurality of fluid-filled chamber support means which supports the fluid-filled chamber such that each fluid-filled chamber does not contact the upper and lower shafts; and
    (h) a controller operative to move the plurality of fluid-filled chamber support means, detect rotational displacement of the steering wheel, and control the plurality of orifice control means based on the rotational displacement of the steering wheel.

2. The apparatus of claim 1, wherein said female bladed part comprises:
    at least two shaft parts having an arc configuration from a cross-sectional view and configured in such a manner as to permit coupling with the male bladed part, which is inserted in such a way that the blades of the male bladed part extend outwards through the gaps provided between the two shaft parts of the female bladed part and are rotatable within a certain angular range as defined by the gaps; and
    a plurality of blades, each of which protrudes from the exterior of a shaft part.

3. The apparatus of claim 1, wherein each orifice control means comprises:
    a stop piece provided in each blade of the male bladed part so as to permit movement along an axis, said stop piece having the same number of communicating orifice as the number of orifice in the male bladed part, such that the degree of alignment of a communicating orifice with an orifice of a male bladed part varies depending on the linear movement of the stop piece;
    a spring elastically supporting the stop piece within each blade of said male bladed part such that the stop piece is biased in a first direction; and
    an orifice control electromagnet operable to pull the stop piece in a second direction, using magnetic force that is under the control of said controller, such that each orifice of the male bladed part communicates with each communicating orifice.

4. The apparatus of claim 1, wherein each fluid-filled chamber support means comprises:
    a plurality of chamber electromagnets controlled by said controller, each chamber electromagnet being positioned on an end of each fluid-filled chamber; and
    at least one permanent magnet operably attached to each of said upper and lower shafts so as to apply magnetic force to each of said chamber electromagnets.

* * * * *